(12) United States Patent
Boachie-Adjei

(10) Patent No.: US 8,113,847 B2
(45) Date of Patent: Feb. 14, 2012

(54) SPINAL SURGERY MODELING SYSTEM

(75) Inventor: Oheneba Boachie-Adjei, Briarcliff, NY (US)

(73) Assignee: K2M, Inc., Leesburg, VA (US)

( * ) Notice: Subject to any disclaimer, the term of this patent is extended or adjusted under 35 U.S.C. 154(b) by 650 days.

(21) Appl. No.: 12/253,965

(22) Filed: Oct. 18, 2008

(65) Prior Publication Data

US 2009/0162821 A1    Jun. 25, 2009

Related U.S. Application Data

(60) Provisional application No. 60/982,079, filed on Oct. 23, 2007.

(51) Int. Cl.
*G09B 23/28* (2006.01)

(52) U.S. Cl. .......................................................... 434/274

(58) Field of Classification Search ................. 434/262, 434/267, 274, 275, 295
See application file for complete search history.

(56) References Cited

U.S. PATENT DOCUMENTS

| | | | | |
|---|---|---|---|---|
| 2,103,021 A * | 12/1937 | Salsman | ........................ | 434/274 |
| 2,108,229 A * | 2/1938 | Metz | ............................. | 434/274 |
| 2,197,975 A * | 4/1940 | Fleet | ............................. | 434/274 |
| 3,020,652 A * | 2/1962 | Ferrari et al. | ................. | 434/274 |
| 3,513,569 A * | 5/1970 | Herou | ............................ | 434/274 |
| 5,704,791 A * | 1/1998 | Gillio | ............................. | 434/262 |
| 6,468,087 B2 * | 10/2002 | Slocum | ........................ | 434/262 |
| 6,582,232 B1 * | 6/2003 | Ney | ................................ | 434/270 |
| 6,908,309 B2 * | 6/2005 | Gil et al. | ....................... | 434/267 |
| 6,947,743 B2 * | 9/2005 | Aitken et al. | ............... | 455/432.2 |
| 7,403,883 B2 * | 7/2008 | Heruth et al. | ................... | 703/11 |
| 7,909,610 B1 * | 3/2011 | Amato | .......................... | 434/270 |
| 7,942,676 B2 * | 5/2011 | Murdach | ....................... | 434/274 |

* cited by examiner

*Primary Examiner* — Kurt Fernstrom

(74) *Attorney, Agent, or Firm* — Carter, DeLuca, Farrell & Schmidt, LLP

(57) ABSTRACT

Provided is a novel spinal surgery modeling system that includes a platform having attachment elements and vertical tensioner supports positioned on a platform so as to effectively connect to and secure a model of a spinal column by use of tension members. The modeling system being configured to support surgical procedure training or surgical plan rehearsals as needed. Also provided is kit including the disclosed system.

17 Claims, 6 Drawing Sheets

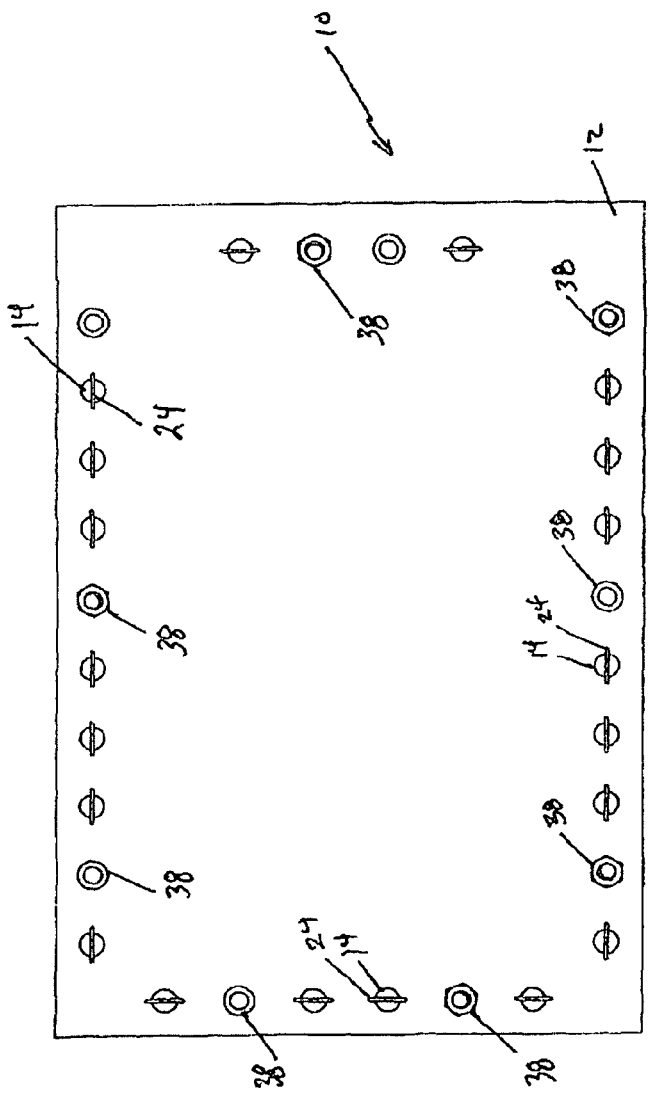
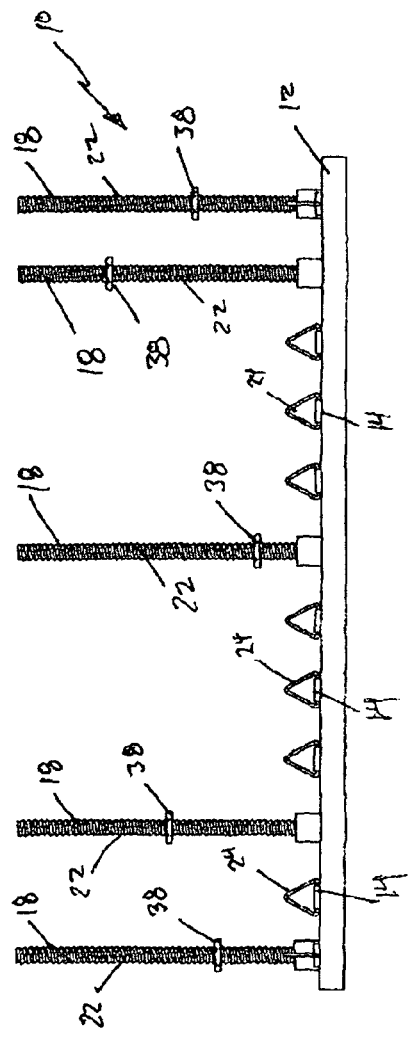
FIG 2A
FIG 2B

SPINAL SURGERY MODELING SYSTEM

This application claims the benefit of Provisional Application No. 60/982,079, filed Oct. 23, 2007, the disclosure of which is fully incorporated herein.

BACKGROUND OF THE INVENTION

1. Field of the Invention

The present invention relates to orthopedic surgery and in particular to surgical devices, prosthesis, and methods for stabilizing and fixing the bones and joints of the body. Particularly, the present invention relates to a system for modeling surgical procedures using surgical methods, devices and instruments as a training or surgery rehearsal system that can provide the user with an anatomically and biomechanically realistic model in a non-surgical environment. More particularly, the present invention relates to a spinal surgery modeling system that can engage with a model of a spine so as to configure the spine in a desired alignment and with selected degrees of force vectors biasing the spine model in the selected position so as to provide a spine modeling system that can be used as a surgeon training device or as a spinal surgery rehearsal platform.

2. Background of the Technology

It is a common surgical requirement to stabilize and fix bones and bone fragments in a particular spatial relationship to correct the location of skeletal components due to injury or disease. This can be accomplished by using a number of bone pins, anchors, or screws placed in bones across a discontinuity in the bone or bone fragments, such as a fracture, or adjacent vertebrae, or joint. They are connected by a rod to maintain a predetermined spatial location of the bones or bone fragments. In some cases the use of these devices may be permanently implanted in the subject. In other cases, the devices may be implanted only as a temporary means of stabilizing or fixing the bones or bone fragments, with subsequent removal when no longer needed. Conventionally, surgeons receive their training in the use of such devices to correct vertebral column injuries and diseases by the application of methods and device on cadavers. The amount of training for each surgeon is necessarily limited by the expense, availability, scheduling, and other logistic requirements associated with the use of cadavers. Further, the biomechanical behavior and particularly soft tissue forces on the spinal column when applying methods and devices to a cadaver are far different from that which are normally experienced in a surgical procedure on a living patient.

Further, spine surgeons when planning for a surgical procedure on a specific patient are normally limited to a study of two dimensional radiographic data and a complete lack of hands on manipulation rehearsal of the method prior to operating on the patient. In recent years there has been a growing number of orthopedic practices and hospitals that have made the transition from film to all digital environments. Software based tools for orthopedic image review, analysis and preoperative planning are becoming conventional tools of the orthopedic surgeon. While advances in surgical planning have been made, they are simply limited to improvements in providing two dimensional data for study and planning. To receive hands-on training or to rehearse a surgical method, the surgeon is still limited to the use of cadavers.

With such training and rehearsal limitations, it is not uncommon during the actual surgical procedure for the surgeon to encounter unforeseen anatomical or biomechanical conditions that may require an immediate revision of the surgical plan as it proceeds. The need to provide more and less expensive ways to train surgeons or to permit hands on surgery planning and rehearsal in the use of spinal surgery methods and devices is particularly needed in the treatment of such conditions as scoliosis. It is not uncommon in the surgical treatment of scoliosis that the forceful manipulation and realignment of the spinal column can be a long, complicated mechanical effort that often includes a serious threat of damage to the spinal cord. In addition to the obvious training benefits that a three dimensional hands on device could provide, the manual rehearsal of planned methods in the treatment of scoliosis could potentially provide a faster, more effective, and safer surgical correction for the patient.

Thus a need exists for a three dimensional hands on system to provide a spinal surgery modeling system that can be used by surgeons for training in the use of new devices and methods and can also be used in the planning and manual rehearsal of surgical procedures for patients.

SUMMARY OF THE INVENTION

The spinal surgery modeling system provides a novel hands on device that is capable of presenting a three dimensional model of a spinal column that can be configured to have any variation of spinal alignment desired and can be positioned in the device with the application of tension members that provide a bias so as to simulate the biomechanical feel and behavior of a patient's spinal column.

Also provided is a spinal surgery modeling system that is capable of securing any of a variety of models of spinal columns that can be selected by size and conformation to simulate, for example, pediatric, adult, and geriatric spinal columns.

Also provided is a spinal surgery modeling system useful for simulating common deformities such as scoliosis, kyphosis, sagittal imbalance, and other spinal abnormalities.

Also provided is a spinal surgery modeling system that includes template indicia corresponding to digital templates provided by conventional orthopedic imaging and planning software.

Also provided is a spinal surgery modeling system that is capable of applying tension members to hold a model of a spinal column in a desired position in a device wherein the tension members can provide holding forces that vary by amount and vector of the applied force in three dimensions.

Also provided is a spinal surgery modeling system that can be prepared to simulate the anatomy and biomechanics of a surgery patient such that a three dimensional hands on surgery rehearsal platform is provided.

Also provided is a spinal surgery modeling system that can include automated features such as a data recorder, a data processor, and automated servos for the application of vectored bias to selected portions of an attached model of a spine.

Also provided is a kit that includes a spinal surgery modeling system, at least one model of all or a portion of a spinal column, and at least one orthopedic appliance that can be implanted in the spine of a patient.

Also provided is a method of simulating spinal surgery using the spinal surgery modeling system.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIGS. 2A-B respectively show a top view and a side view of the spinal surgery modeling system;

DETAILED DESCRIPTION OF THE INVENTION

Figure 1:
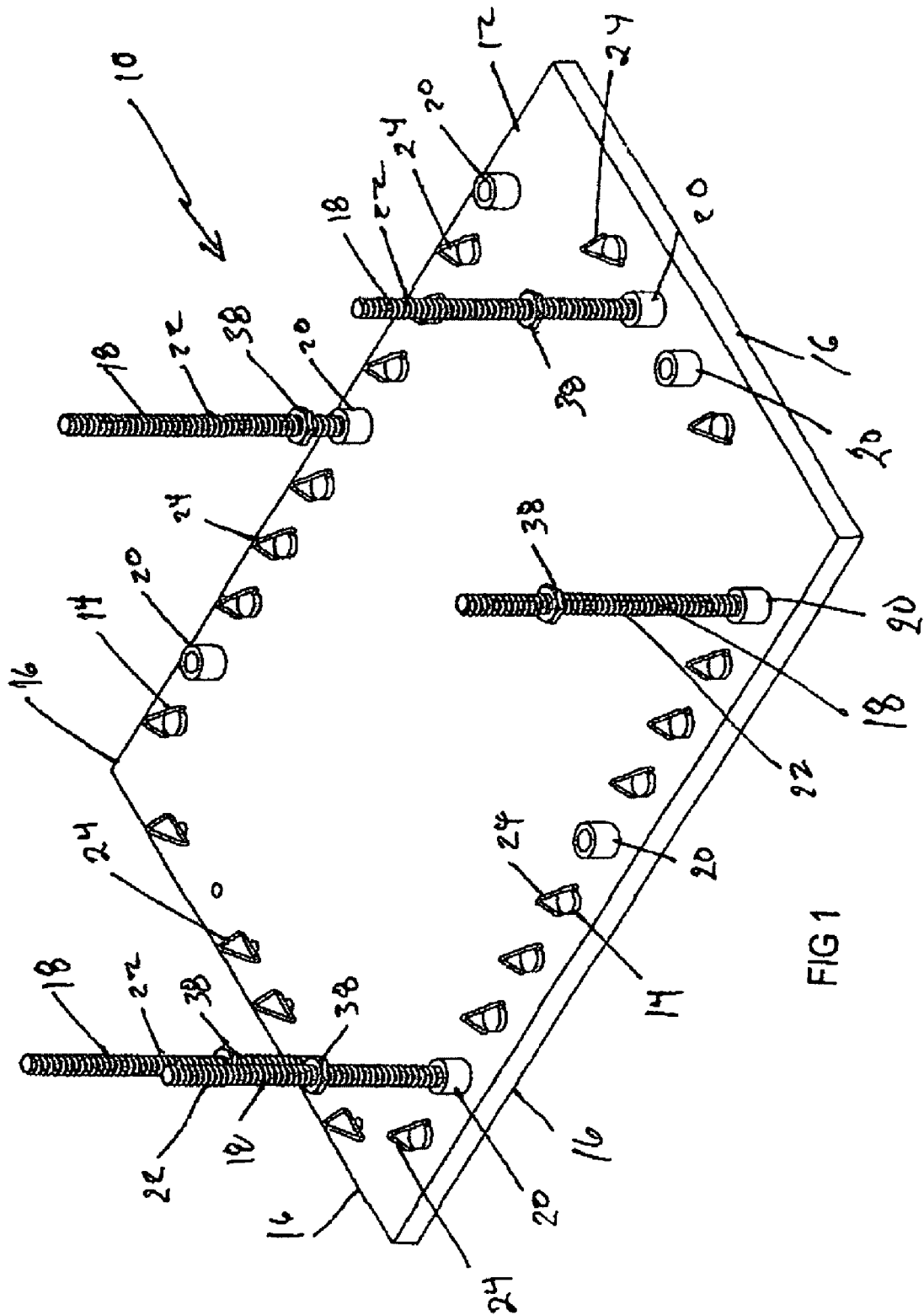
FIG. 1 shows an isometric view of the spinal surgery modeling system.
Figure 3C:
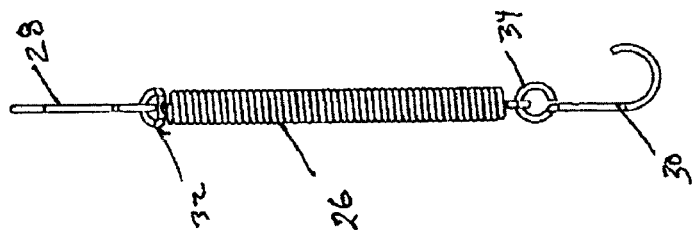
FIGS. 3A-C show an exemplary tension member from three varied lateral aspects that can be used with the spinal surgery modeling system.
Figure 3B:
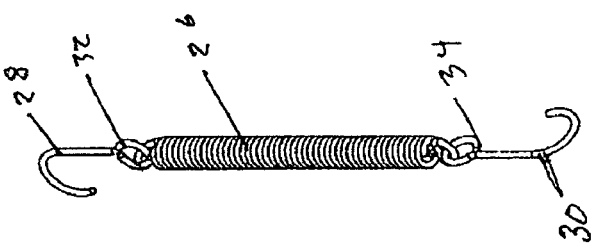
Figure 3A:
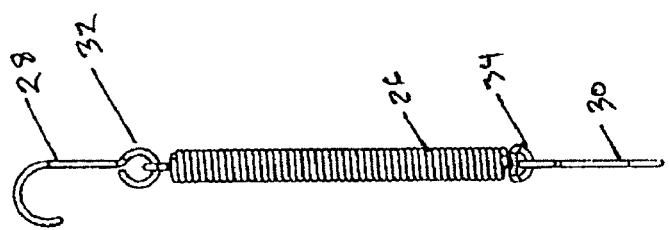

Detailed embodiments of the present invention are disclosed herein; however, it is understood that the following description is provided as being exemplary of the invention, which may be embodied in various forms without departing from the scope of the claimed invention. Thus, the specific structural and functional details provided in the description are non-limiting, but serve merely as a basis for the invention defined by the claims provided herewith.

As shown in the accompanying figures a novel spinal surgery modeling system, generally shown at 10, is provided with a stable platform 12 having multiple anchor attachment elements 14 attached at different locations along the platform perimeter 16. The attachment elements 14 can be uniformly positioned around the platform perimeter 16 or can be located in selected positions to accommodate specific user requirements. The platform 12 also is provided with multiple vertical supports 18, which are also located proximate to the perimeter 16 of the platform 12. The number of attachment elements 14 and vertical supports 18 can vary according to the specific need of the user and can be interchanged one for the other at any of the positions around the platform perimeter 16.

Each of the vertical supports 18 includes a vertical support mounting base 20, which provides a stable foundation for a vertical support shaft 22. The vertical support shaft 22 is releasably attached to the vertical support base 20 so as to enable the selective positioning of each of the vertical support shafts 22 as needed around the platform perimeter 16. The vertical support shafts 22 are preferably threadably attached to their respective vertical support bases 20; however, it is within the inventor's conception that any known releasable attachment capable of providing a secure connection can be used, such as, for example, bayonet attachments, friction fit attachments, knob and groove connections, and the like.

The anchor attachment elements 14 can include a tension member connector 24 configured to facilitate easy connection and disconnection of the anchor attachment elements 14 to at least one tension member 26. As shown in FIGS. 1, 2A-B, and 5A-B, a preferred embodiment of the system 10 is provided with eyelet type tension member connectors 24. It is, however, with the inventor's conception that any suitable connector can be used that facilitates quick, easy connection and disconnection one or more tension members 26.

Figure 4C:
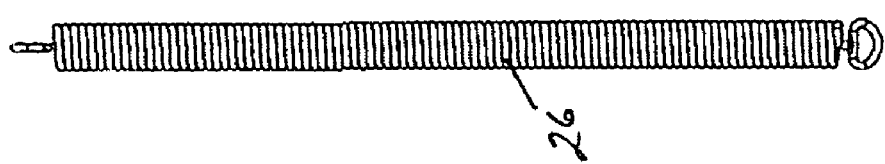
FIGS. 4A-C show lateral aspects of examples of alternative tension members of varying size and force capacity that can be used with the spinal surgery modeling system.
Figure 4B:
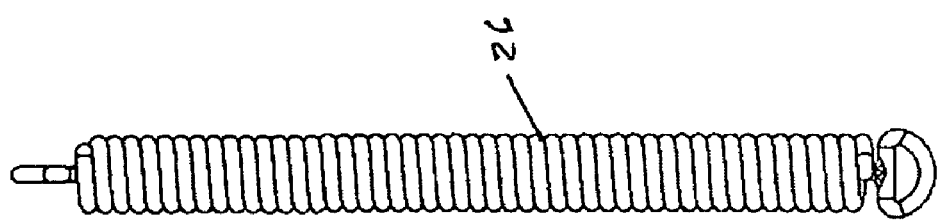
Figure 4A:
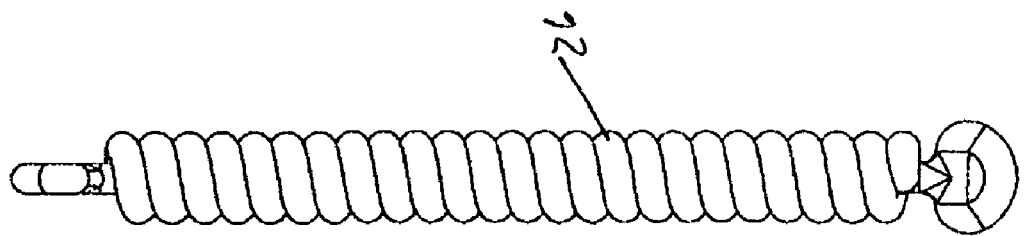

As shown in FIG. 1, the preferred tension members 26 can be provided as coiled springs having a first attaching member 28 and a second attaching member 30. The first and second attaching members 28, 30 can be securely attached to or integrally formed with the first and second opposing ends 32, 34 of the tension members 26. The attaching members 28, 34 in a preferred embodiment can be hooks, which can be easily connected and disconnect; however, as shown in FIGS. 4A-C, The tension members 26 can be provided as a set of differing coiled springs having closed attachment members, the coiled springs varying in length and strength so as to allow the user to select the degree of tension used at different points in the system 10.

Figure 5A:
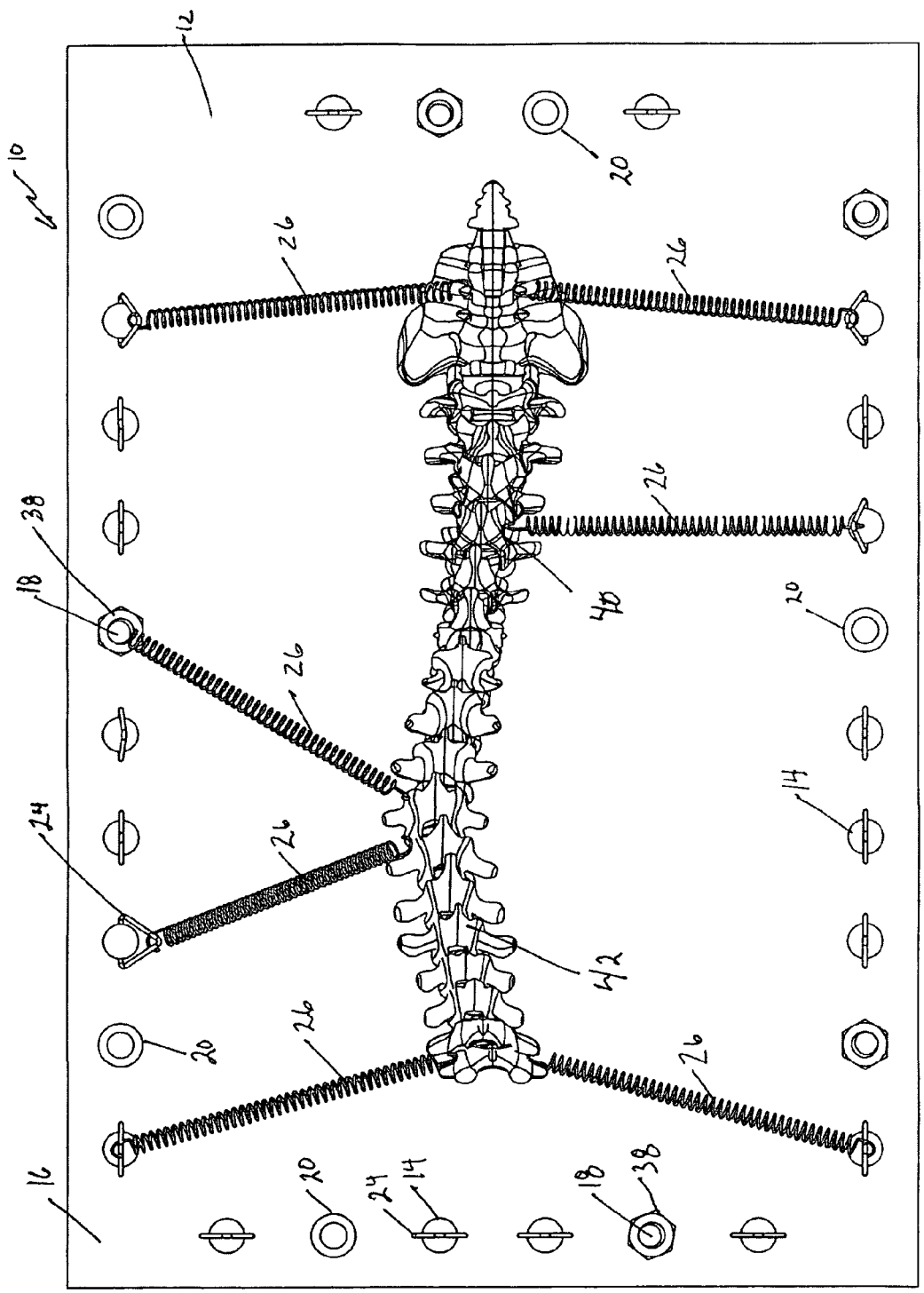
FIGS. 5A-B respectively show a top view and an isometric view of the spinal surgery modeling system having a model of a spinal column secured in a selected conformation and held in the selected position by different tension members at selected force and bias vectors.
Figure 5B:
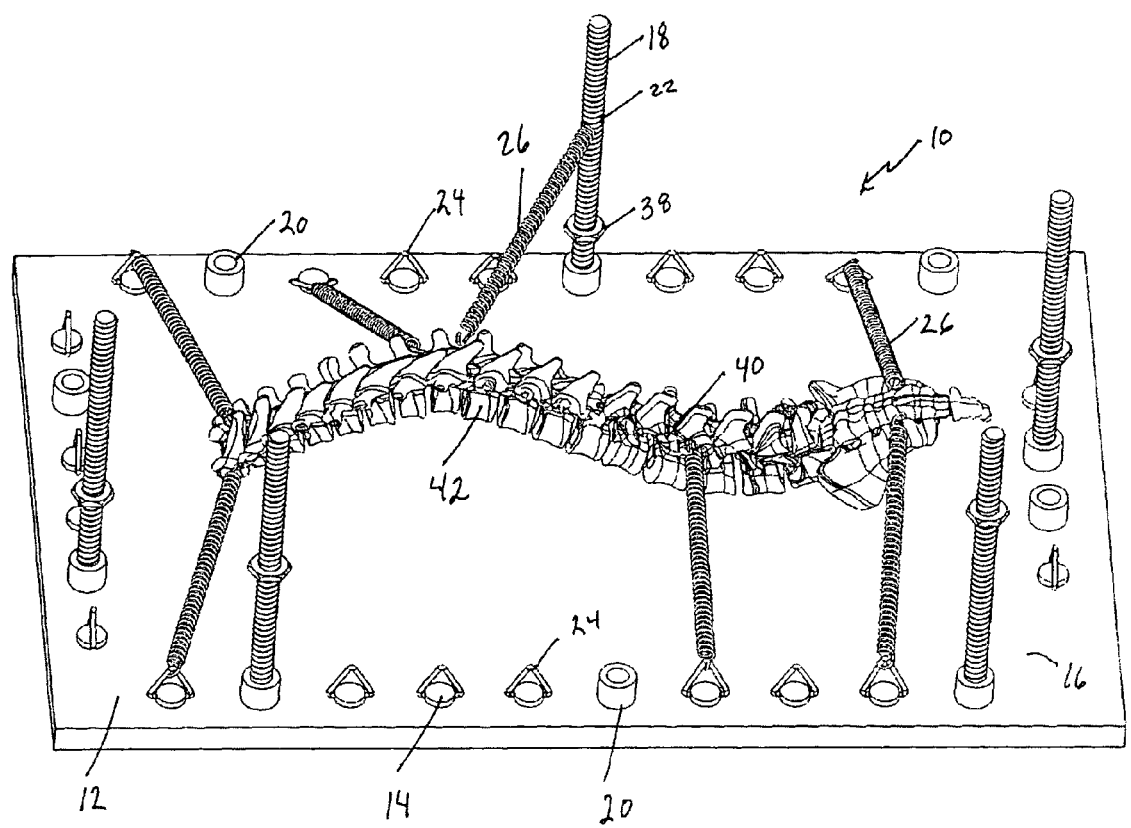

The vertical support shaft 22 can be provided as a threaded shaft having a threadably engaged tension member retainer 38 that can be adjusted in position along the length of the vertical support shaft 22 as desired. The tension member retainer 38 is sized and configured to selectively retain the attaching member 28 of a tension member 26 so as to provide an elevated anchoring contact for tension members 26 when desired. FIGS. 1, 2B, and 5A-B show vertical support shafts 22 with tension members retainers positioned at varying elevations above the platform 12. FIG. 5A-B shows a model of a spinal column attached by tension members 26 to the platform 12, wherein some of the tension members 26 are connected to vertical support shafts 22 at elevated positions. As shown in FIG. 5A-B, the tension member first end 32 can be connected to the platform 12 by the releasable connection of a first attaching member 28 to an anchoring attachment elements 14 while the tension member second end 34 is attached to a model of a spine by releasable attachment of a second attaching member 30 to a position on the spinal column or alternatively to a position on the construct 40 being surgically inserted along the spinal column 42. As illustrated in FIG. 5A-B, the effect of attaching a model of a spinal column 42 to the platform 12 using various tension members 26 connected at different elevations to the anchoring attachment elements 14 or the vertical tensioner supports 18 is to produce a model of a spinal column the alignment of which may be contorted into an abnormal conformation, such as would be found in a patient suffering from scoliosis or other ailment.

By varying the position and force of tension applied by the tension members 26, a spinal surgery model can be provided for use as a training device upon which surgeons can employ surgical methods and devices in a non-surgical environment. The use of the modeling system 10 can be repeated as necessary to ensure a good understanding of the surgical methods and devices used without the imposition of the conventionally high cost of using cadavers to attempt to achieve the same end result.

Additionally, the system 10 can be configured to model the spinal column conformation of an actual patient scheduled for a future surgical procedure so that the modeling system 10 can be used by the surgeon as a tool to permit hands on rehearsal of the planned procedure without cost or potential harm to the patient. Used in this manner the system 10 can permit the surgeon to alter his surgery plan as he sees fit based upon the initial rehearsal session using the modeling system 10. Such rehearsal can involve using spinal instruments to implant spinal implants into the spine model as intended during surgery, to assess the effectiveness of the surgical plan. The hands on modeling system 10 can be used in close coordination with the data obtained by known methods for preparing plans for surgical procedures. Templates normally prepared in two dimensional models for surgery plans can be incorporated into the three dimensional model of the present modeling system 10 so as to provide a very close fit of the model to the actual anatomy and biomechanics of the patient. While the system preferably is intended to model surgical procedures, it can also be employed to provide a model test bed for new designs of surgical instruments and surgical implants.

Further, models of the spinal column 42 can be provided with the system 10 as part of a kit, which can include spinal models of different sizes for pediatric, adult, and geriatric patients. Additionally, models of spinal columns can be provided that reproduce different features of common abnormalities so as to provide a realistic model for use in surgical training or rehearsal, possibly to include use of spinal implants and instruments on the spinal model.

It is also within the inventor's conception that many of the features of the system, such as the degree and vectors of force imposed on the model of the spinal column 42 by use of the tension members 26 can be automated. This can be accomplished by the use of tension sensors, data recorders, servo assisted tension members and vector adjustments, as well as computer assistance in preparing the conformation of the modeling system 10 and analyzing the result on the spinal column and the degree of potential danger to the nervous system for any procedure practiced.

Finally, it is within the inventors' conception that the spinal surgery modeling system 10 disclosed herein can be electronically duplicated to provide a virtual surgery modeling system wherein the surgeon can train or rehearse surgical procedures using realistically modeled surgical instrument devices that transmit the surgeon's manipulations into a virtual surgical model which provides immediate visual and mechanical feedback to the user. Virtual reality systems well known in the art can be employed to achieve this aspect of the inventor's conception. As is known in the art, visual feedback of a virtual reality embodiment of the modeling system 10 can be provided by producing an image on a screen or by transmitting an image to a visual presentation produced in headgear worn by a user. Similarly, as is known in the art, mechanical or tactile feedback can be provided to the user using servos to produce hand manipulation and simulated tension feedback as programmed into the automated embodiment.

The materials used to construct the present invention are those which have sufficient strength and resiliency to support the forces that are imposed by the tension members 26, as well as the surgical manipulations of the model of the spinal column 42.

It is within the concept of the present invention to provide the spinal surgery modeling system 10 as a kit for use in a surgical process, the kit including the system 10 as described herein, as well as at least one other surgical instrument or device. Non-limiting examples of such surgical instruments or surgical implants that can be included in such a kit included, for example, the devices disclosed in U.S. Pat. No. 5,733,286, U.S. Pat. No. 5,683,392, U.S. Published Application 2007/0093849, U.S. Published Application 2007/0093817, U.S. Published Application 2007/0213722, U.S. Published Application 2007/0016197, all of which are fully incorporated herein by reference. Additionally, well known and conventionally used surgical instruments and implants can be included with system 10 to provide a kit. In addition, the kit can contain at least one anatomical model of a spinal column or a portion of a spinal column for use with the system 10.

Each of the embodiments described above are provided for illustrative purposes only and it is within the concept of the present invention to include modifications and varying configurations without departing from the scope of the invention that is limited only by the claims included herewith.

What is claimed is:

1. A novel spinal surgery modeling system, the system comprising:
   a model of at least a portion of a spinal column; and
   a platform having multiple anchoring attachment elements, multiple vertical tension supports, and multiple elongated tension members, each of said elements or vertical supports being attached to and disposed around the perimeter of the said platform, said anchoring attachments and said vertical supports being configured to be capable of attachment to at least one elongated tension member, each elongated tension member having at least one attachment member configured for ease of attachment and release as selected, the platform sized and configured to support said model within the perimeter of said platform by attachment to said tension members.

2. The system of claim 1, wherein said at least one attachment member comprises an attachment member at each end of said at least one elongated tension member.

3. The system of claim 1, wherein said vertical supports comprise a tension member retainer.

4. The system of claim 1, wherein said multiple of tension members comprises tension members that have a variety of force of tension capacity.

5. The system of claim 3, wherein said tension member retainers are adjustably engaged with said vertical supports.

6. The system of claim 3, wherein said tension member retainers are threadably engaged with said vertical supports.

7. The system of claim 1, further comprising at least one member of the group consisting of data recording device, data processing device, and automated servos.

8. The system of claim 1, wherein said modeling system is incorporated into a virtual reality automated modeling system.

9. The system of claim 8, wherein said virtual reality automated modeling system comprises visual and tactile feedback mechanisms for a user.

10. A method of modeling a spinal surgery procedure, the method comprising:
    providing the spinal surgery modeling system of claim 1;
    providing at least one surgical device for use or implantation with a spinal column;
    providing at least one surgical instrument for use in spinal surgery;
    positioning said at least a portion of a spinal column in said modeling system by connection of said model to said platform using said tension members, connecting said at least one surgical device to said model using said surgical instruments and manipulating said model as necessary.

11. The method of claim 10, further comprising repeating the positioning and connecting steps as necessary.

12. A method of training surgical procedures and the use of surgical instruments and devices, the method comprising:
    providing the spinal surgery modeling system of claim 1;
    providing at least one surgical device for use or implantation with a spinal column;
    providing at least one surgical instrument for use in spinal surgery;
    positioning said at least a portion of a spinal column in said modeling system by connection of said model to said platform using said tension members, connecting said at least one surgical device to said model using said surgical instruments and manipulating said model as necessary.

13. The system of claim 1, wherein at least one attachment element and at least one vertical support element is removably attachable to the platform.

14. The system of claim 13, wherein at least one attachment element is interchangeable with at least one vertical support element.

15. The system of claim 1, wherein at least one vertical support element includes a mounting base and a vertical support shaft, the vertical support shaft being releasably attachable to the mounting base.

16. The system of claim 1, wherein at least one attachment element includes a connector configured to facilitate connection of the attachment element to one of the elongated tension member.

17. The system of claim 16, wherein the connector is an eyelet.

\* \* \* \* \*